United States Patent [19]

Zitone

[11] 4,093,306
[45] June 6, 1978

[54] AUXILIARY RIDER SUPPORT FOR JOG CARTS

[76] Inventor: Joseph Zitone, R.F.D. 1, Port Jervis, N.Y. 12771

[21] Appl. No.: 781,364

[22] Filed: Mar. 25, 1977

[51] Int. Cl.² ............................................. A47C 3/00
[52] U.S. Cl. ..................................... 297/217; 280/63; 297/423
[58] Field of Search .......................... 280/63, DIG. 6; 297/250, 252, 423, 429, 217; 248/286, 287

[56] References Cited

U.S. PATENT DOCUMENTS

| 80,941 | 8/1868 | Gilbertson | 280/4 |
|---|---|---|---|
| 491,831 | 2/1893 | Blood | 54/45 |
| 1,283,168 | 10/1918 | Hart | 297/423 |
| 2,187,509 | 1/1940 | Abbe | 298/1 R |
| 3,167,790 | 2/1965 | Hickey | 297/252 UX |
| 3,591,112 | 7/1971 | Gormhausen | 297/252 X |

Primary Examiner—Joseph F. Peters, Jr.
Assistant Examiner—Norman L. Stack, Jr.
Attorney, Agent, or Firm—Dennison, Dennison, Meserole & Pollack

[57] ABSTRACT

An auxiliary rider support for jog carts incorporating an upper adjustable hook engagable over a jog cart shaft and a lower locking member threadedly engagable with the projecting end the locking member and the hook cooperates with both to enable a fixing of the support to the jog cart. The support includes a seat fixed to and overlying the hook and a footrest and guard assembly spaced therebelow.

14 Claims, 6 Drawing Figures

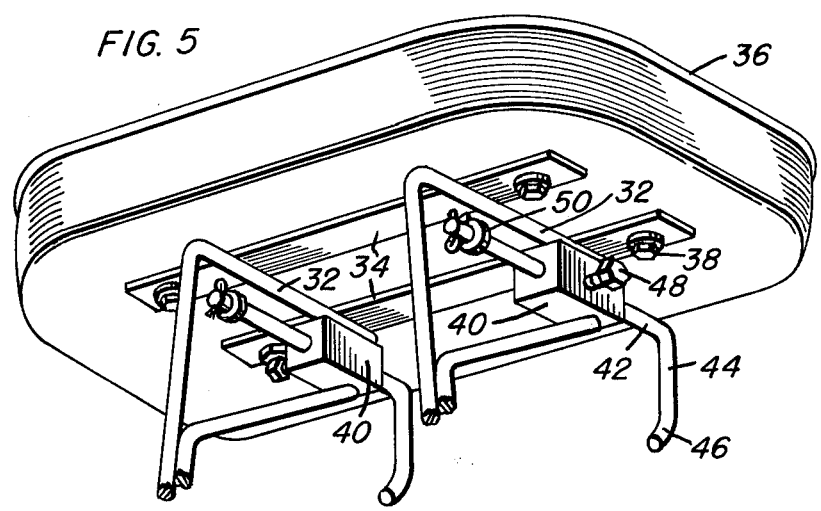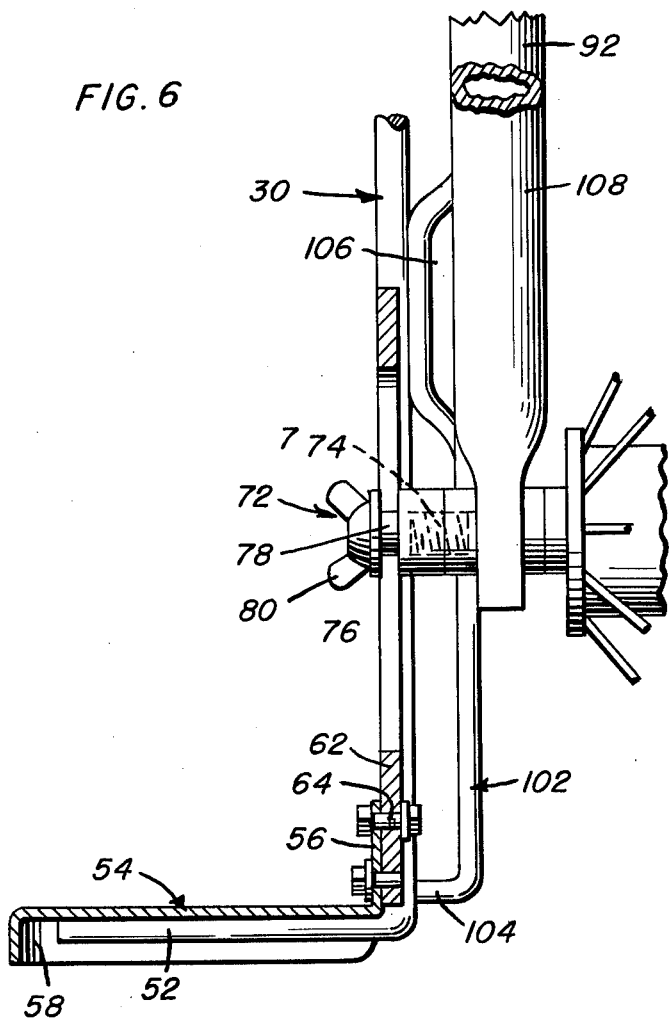

AUXILIARY RIDER SUPPORT FOR JOG CARTS

BACKGROUND OF THE INVENTION

When breaking young two-year old colts and fillies to a jog cart for training and racing purposes, it is necessary to have one man walk along each side of the horse, to the rear thereof, with lead lines extending to the head of the horse. These lead lines, known as the third and fourth lines, are in addition to the first and second lines which are controlled by the trainer seated on the regulation seat on the jog cart.

The purpose of the third and fourth lineman is to keep the young horse from rearing up into the air which could in turn result in a rearward falling of the horse, doing damage to himself, the jog cart, and possibly the trainer. By using the third and fourth lineman, the trainer has complete control of the horse at all times. Normally, after a few days, one man and a line can be eliminated with the second man and line being required for from two days to two weeks, depending upon the progress of the particular horse.

During that portion of the training involving the use of one or both of the lineman, the men will frequently have to sprint to keep up with the horse. At those times when the horse is moving too fast for the men to keep up with on foot, it is normal practice for the men to jump up and sit on the shafts of the cart to each side of the trainer. The third and fourth lines are long enough to reach from the horse's bit to the rear of the jog cart, thus causing no difficulty in this regard.

This ride on the shaft of the jog cart can last anywhere from 20 yards to 100 yards or more before the horse starts to act up and the men have to jump off to control the horse. This action is repeated many times during the training of the horse.

In addition to the obvious danger involved in jumping onto and off of the shaft, the shaft section that the lineman sit on is, of necessity, directly over the wheels. This in turn is very uncomfortable and presents a substantial danger in view of the frequency tendency for the feet, and particularly the heels, of the men engaging against or actually getting caught within the rapidly rotating wheel spokes. Not only can this cause injury to the men themselves, but, because of the noise produced, the horse will frequently be spooked.

Infofar as is known, the only means for avoiding the discomfort and danger associated with sitting on the shaft of the bike is the less-than-satisfactory use of a flat board wired to the shaft and covered with padding. This solution makes no provision for protecting the feet of the linemen or the wheel of the cart. By the same token, the proper mounting and removal of the board is difficult and time-consuming.

SUMMARY OF THE INVENTION

The present invention is directed to a quick-mounting and demounting rider support for jog carts which incorporates both a seat and a combined footrest and guard. The support, adjustable for mounting on either side of the jog cart, is positioned directly over the wheel, at the point where the lineman normally sits and, after a one-time adjustment, can be locked to and unlocked from the jog cart by the manipulation of a single fastener member.

BRIEF DESCRIPTION OF THE FIGURES

FIG. 5 is a bottom perspective view of the shaft engaging hook portion of the frame and the overlying seat; and FIG. 6 is a cross-sectional detail taken substantially on a plane passing along line 6—6 in FIG. 3.

DESCRIPTION OF THE PREFERRED EMBODIMENT

Figure 1:
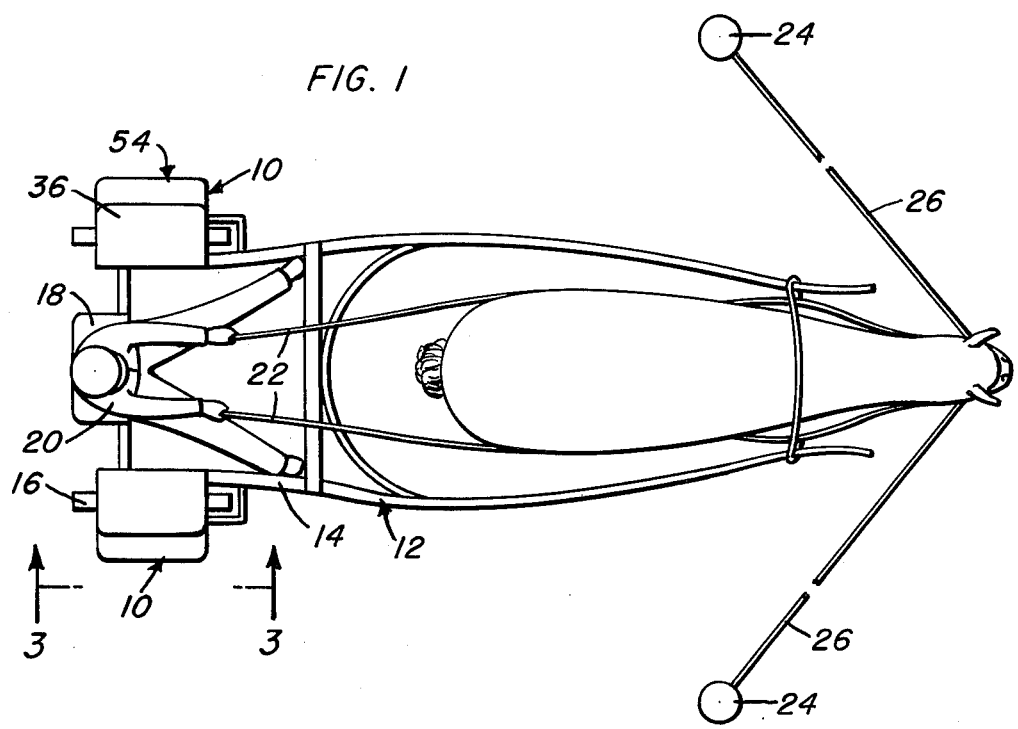
FIG. 1 is a plan view of a horse-attached jog cart having two of the supports of the invention mounted thereon.

Referring now specifically to the drawings, reference numeral 10 is used to designate the auxiliary rider support. The support 10 is particularly adapted for use in conjunction with a jog cart 12, mounting on either one or both of the opposed shafts 14 in general alignment over the cart wheels 16 adjacent the regulation seat 18.

In use, the primary trainer 20 sits on the regulation seat 18 and exerts control on the horse through two primary lines 22. The auxiliary supports 10 are provided for selective use, as required, by one or two linemen, schematically shown at 24, who handle third and fourth lines 26.

The support 10 includes a vertically oriented rigid rod frame 28. The frame 28 includes a pair of laterally spaced rigid rods 30. The rods 30 diverge downwardly from spaced upper portions to more widely spaced lower portions.

The upper ends 32 of the rods 30 are horizontally directed so as to project laterally inward, that is toward the cart, and are interconnected by a pair of transversely positioned rigid straps 34 welded across the tops of the inwardly directed ends 32. The straps 34 project beyond the respective rod ends or end sections 32 and are utilized to secure an overlying seat 36 by appropriate bolt means 38.

Figure 4:
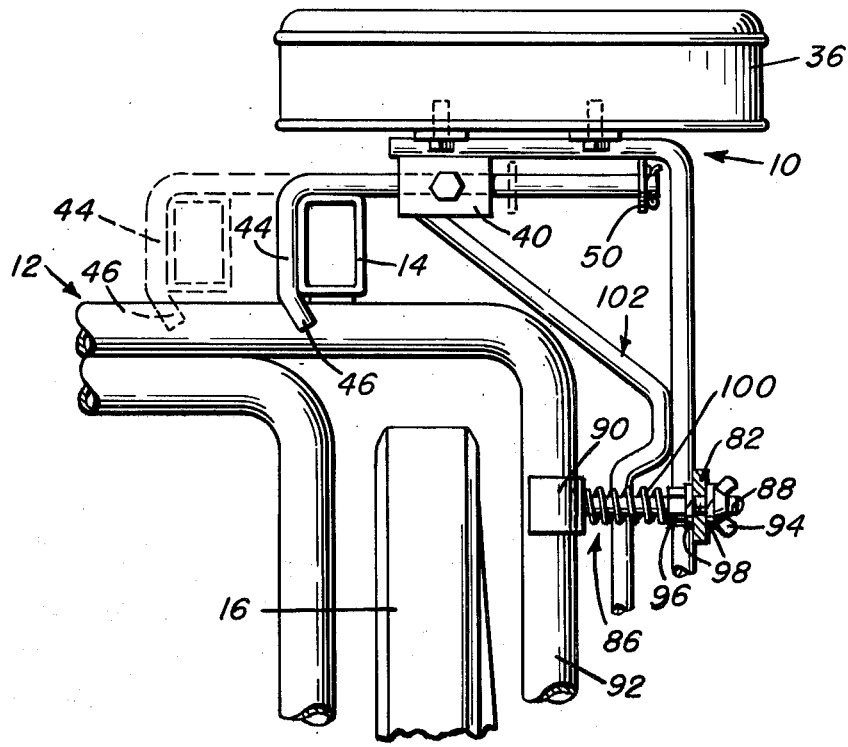
FIG. 4 is a cross-sectional detail taken substantially on a plane passing along line 4—4 in FIG. 3.
Figure 2:
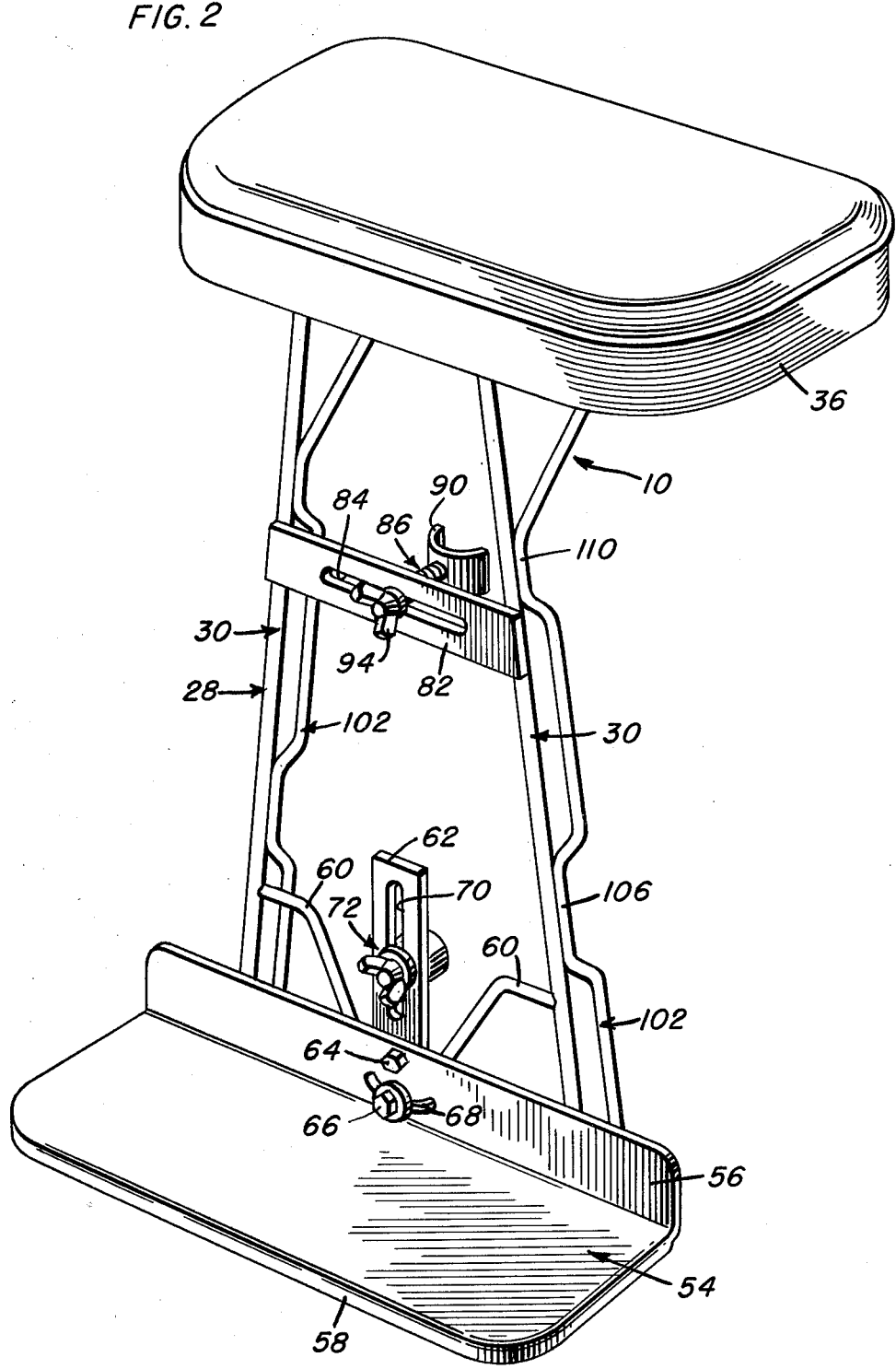
FIG. 2 is an enlarged perspective view of the rider support.
Figure 3:
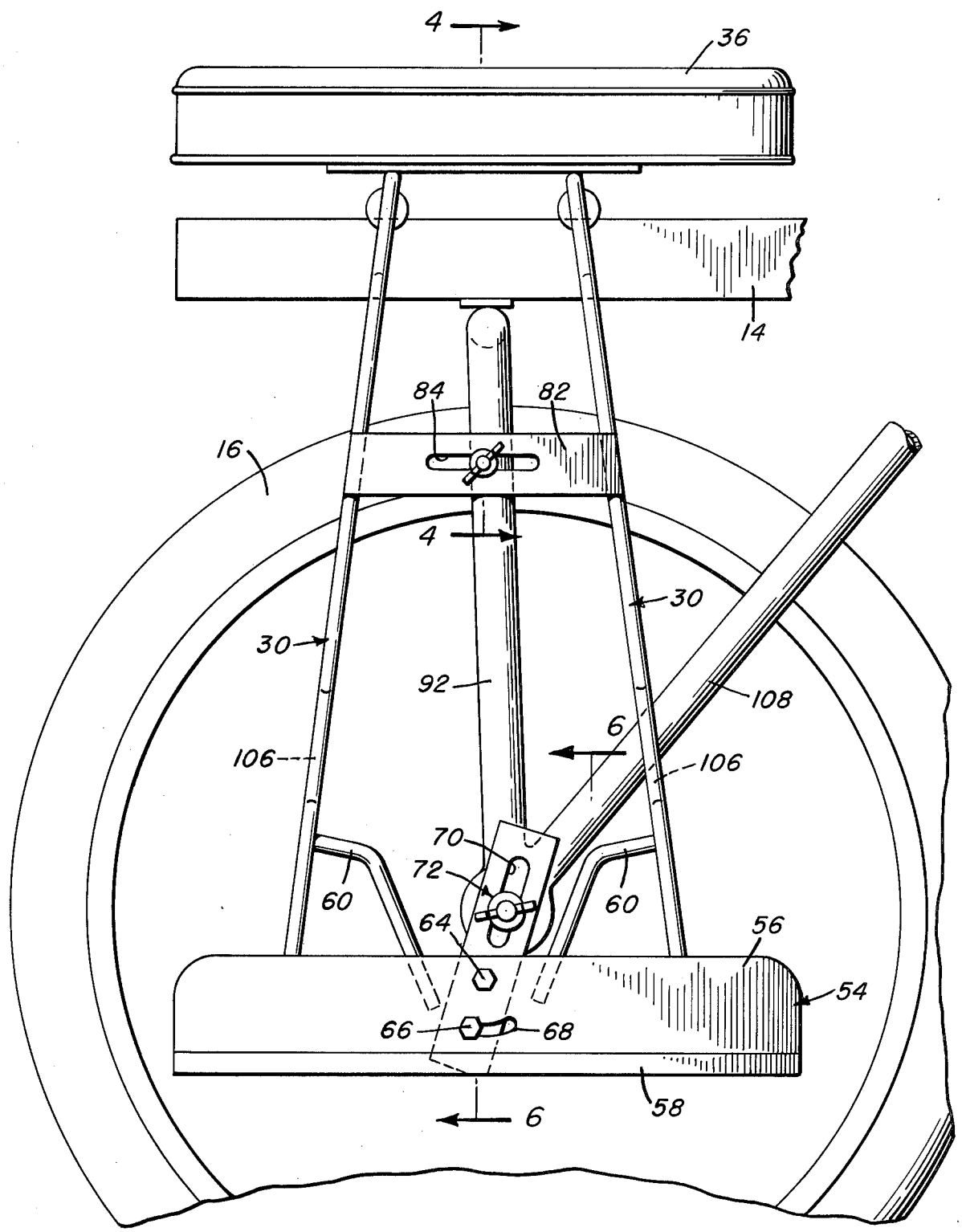
FIG. 3 is an outer elevational view of the support mounted in operative position on a jog cart.

Affixed in underlying relation to the inner ends of the inturned end sections 32, as by welding or the like, are a pair of blocks 40, each having a longitudinal bore therethrough paralleling the overlying inturned end section 32. Each bore slidably receives an elongated shaft 42 which terminates, at its inner end, in a downwardly directed hook portion 44 including a slightly curled end 46. An appropriate set screw 48 is laterally threaded into each block 40 so as to selective engage and lock the shaft or rod 42 in any selected adjusted position thereof, the shaft including a stop-washer 50 on the free end thereof so as to preclude accidental removal. With reference to FIG. 4 in particular, it will be appreciated that the adjustment of the hook means is specifically intended so as to accommodate variations in the positioning of the shafts 14 on jog carts of different makes. Once the hook means is adjusted for a particular jog cart, the support, as shall be explained in more detail subsequently, is set up for repeated rapid mounting and removal from the jog cart without requiring any further adjustment of the hook means.

The lower ends or end sections 52 of the frame rods 30 extend horizontally outward and support a plate-like footrest 54 thereon and welded thereto. The footrest 54 includes an integral upwardly projecting rear flange 56 engaged against the frame rods 30, and a relatively short flange 58 about the outer and two side edges. If so desired, the footrest can have an embossed gripping surface.

Inasmuch as the frame 28 and footrest 54 will, upon a mounting of the support 10, be positioned immediately outward of the rotating wheel 16 of the jog cart 12, particular provision must be made for avoiding any possibility of the rider's feet, and more particularly heels, coming in contact with the wheel or wheel spokes. This problem is accentuated by the fact that the footrest 54 is generally relatively narrow so as to avoid any excess extension beyond the side of the cart.

The heel guard means provided includes a pair of angularly bent rods 60, each rod 60 having a lower end portion welded to the inner face of the vertical flange 56 of the footrest 54 to one side of the center thereof. The rods 60 then extend upwardly, diverging slightly and terminating in upper portions which project in a generally opposed horizontal directions laterally to the adjoining frame rod 30 at which point each rod 60 is welded to the rod 30. It is of course contemplated that the configuration and orientation of each heel guard rod 60 be such as to preclude passage of the heel or rear portion of a rider's foot therebeyond.

A further protection against inward passage of the foot of the rider is provided by a rigid vertical bar 62 pivoted to the footrest flange 56 between the guard rods 60 by appropriate pivot-pin means 64. The bar 62 extends slightly below the pivot-pin 64 and mounts a second pin means 66 which extends through an arcuate adjustment of the bar 62. Either one or both of the pin means 64 and 66 may be of a type which can be tightened so as to lock the bar 62 in an adjusted position. The upper portion of the bar 62 has an elongated slot 70 centrally therethrough. Slidably mounted in this slot is lock means 72 which, through the adjustment provided by the slot 70 and the arcuate movement of the bar 62, can exactly align with the projected threaded end of the wheel axle 74 such as is conventionally provided on jog cart wheels. This threaded axle is quite similar to that found on conventional bicycles.

The lock means itself includes an enlarged internally threaded nut sleeve 76 which opens inwardly so as to receive the threaded end of the axle 74. This sleeve or nut 76 is fixed to an outwardly projecting reduced diameter shaft 78 which is rotatably and slidably received through the slot 70. The outer end of the shaft 78 has a handle 80, for example an enlarged wing nut, fixed thereto for a manipulation of the threaded sleeve 76. As will be appreciated, both the threaded sleeve 76 and the handle 80 are of a size so as to preclude passage through the slot 70, thereby effectively retaining the locking means 72 on the plate or bar 62.

Positioned vertically between the top of the bar 62 and the seat 36 is a plate or bar 82 welded to the outer surfaces of the frame rods 30. This bar 82 includes an elongated slot 84 centrally therethrough within which stabilizing means 86 is mounted. The stabilizing means 86 includes an elongated rod 88 received through the slot 84 and projecting inwardly. The inner end of the rod 88 mounts an inwardly directed U-shaped saddle 90 which is specifically adapted to engage about the outer fork member 92 of that portion of the frame of the jog cart mounting the wheel 16. At least the outer end portion of the rod 88 is threaded so as to enable a longitudinal adjustment and positioning of the rod 88 and saddle 90 by means of an outer adjusting wing nut 94 and an inner lock nut 96. Appropriate lock washers 98 are engaged respectively between the outer and inner nuts 94 and 96 and the outer and inner faces of the bar 82. If desired, an appropriate expanded coil spring 100, engaged between the saddle 90 and the inner nut 96, can be used to prevent any tendency for the nut 96 to vibrate loose. As will be readily appreciated, the elongated slot 84 enables a lateral adjustment of the stabilizing means 86 so as to properly engage the frame fork member 92.

The auxiliary rider support 10 is completed by providing a reinforcing or bracing rod 102 generally along the inner side of each of the frame rods 30. Each of the reinforcing rods 102 generally parallels the corresponding frame rod 30 for a major portion of the heighth thereof and in inwardly spaced relation thereto. The lower end portion 104 of each rod 102 is outwardly bend and welded to the corresponding frame rod 30. At a point upwardly spaced from the footrest 54, and generally slightly above the heel guards 60, each reinforcing rod 102 is inwardly deformed, as at 106, so as to, for a portion of the length thereof, directly engage the frame rod 30. In this manner a convenient point for a welding together of the rods is provided. In addition, and of primary significance, is the fact that a recess is provided for accommodating the diagonal bracing member 108 of the cart frame. This bracing member 108 conventionally extends from the wheel axle forwardly and upwardly to the overlying frame components of the cart. As will be appreciated, this off-set portion 106 is provided in conjunction with both reinforcing rods 102 in that the seat is adapted for mounting on either side of the jog cart.

Another off-set 110 is provided in each reinforcing rod 102 at a point above the upper transverse plate 82, also providing a point for weld engagement with the frame rod 30 From this point of engagement with the frame rod 30, the reinforcing rod 102 extends diagonally inwardly and upwardly to engagement with the corresponding block 40 which provides for the adjustability of the hook means. The upper end of each of the reinforcing rods 102 is welded to the corresponding block 40 and provides a highly effective means for stabilizing the hook means and overlying seat.

In providing auxiliary seats or supports for the linemen, a significant consideration is the ability of the seat to be mounted and removed quickly and, preferably, without requiring the use of tools. As will be appreciated, the auxiliary support or supports will only be used when working with inexperienced horses and will be removed from the jog cart when jogging or training an experienced horse.

In adapting the support to a particular jog cart or particular make of jog cart, only a one-time tool adjustment of the components is necessary. This involves a proper location of the adjustable hook means so as to, in combination with the positioning of the stabilizing means 86, snugly engage the cart shaft 14 upon a tightening of the lock means 72 to the projecting threaded end of the corresponding wheel axle. As will be appreciated, upon a threading of the internally threaded sleeve or nut 76 on the wheel axle 74, there will be a slight pivoting of the support about the point of engagement between the stabilizing means saddle 90 and the fork member 92 of the frame, this will in turn outwardly snug the hook means 44 about the cart shaft 14 with the turned end 46 engaging slightly under the shaft. Once the initial adjustment has been made, one need merely manipulate the enlarged head 80 on the axle engaged locking means 72 so as to effect a mounting or removal of the support. In other words, when removal of the support is desired, the axle locking means will be loosened and the support pivoted upward and outward so as to disengage the hook means from the shaft 14. By the same token, a rapid mounting of the support is affected by the first engaging the hook means about the shaft 14 and then downwardly swinging the support so as to align the internally threaded sleeve with the axle and then screw or tighten the sleeve onto the axle, this in turn pivoting the hook means tightly outward against the shaft 14 because of the intermediate pivot point provided by the saddle 90. As previously indicated, the pivotal mounting of the bar 62, as well as the slot in this bar and in the bar 82 allow for a convenient means to easily adjust the support to various minor differences which might occur between different makes of jog carts.

While the support is particularly intended for use by the linemen which assist the trainer during the initial training of a horse, it can also provide other important functions, such as accommodating an instructor observing a student driver or a student driver observing an experienced driver. It can also be used by a veterinarian, farrier, or the like, to determine the possible existance or irregularities during the running of the horse. It will also of course function to merely take one for a ride. However, the primary function is to provide a convenient and safe means for linemen to ride the shafts and both quickly mount and demount from the cart, this being provided for by the open nature of the seat and footrest coupled with the provision of guard means so as to completely preclude any accidental engagement of the foot with the wheel. It will be appreciated that all of these advantages are achieved while at the same time providing an open frame work construction which is lightweight both so as to not affect the cart itself and also so as to be capable of being easily mounted and handled by a single person. It is presently contemplated that the entire support will weigh approximately 17 lbs.

It is also of interest to note that the support, and the manner of mounting the support on the shafts over the wheels, in no way interferes with the movement of the driver to and from the regulation seat, the back of the auxiliary support seat normally lining up with the inside of the regular shaft of the cart, note for example FIG. 4.

Should such be considered necessary or desirable, a small backrest portion, as well as side hand grips, can be added onto the seat. However, as a practical matter, such additions would normally not be necessary or desirable in that they might tend to restrict rapid movement into and out of the seat. Finally, appropriate padding can be provided at the various points of engagement between the support and the jog cart, for example within the shaft engaging hook means and within the fork engaging saddle 90.

The foregoing is considered illustrative of the principles the invention and, since modifications and changes may occur to those skilled in the art, it is not desired to limit the invention to the exact construction and operation shown and described. Accordingly, resort may be had to all suitable modifications and equivalents falling within the scope of the invention as claimed.

I claim:

1. For use on a jog cart incorporating a pair of forwardly directed shafts and a cart frame mounting said shafts on wheels, a quick attaching and readily detachable auxiliary rider support, said support comprising an upright frame having an inner side and an outer side, said support frame also having an upper portion and a lower portion, hook means on the upper portion of the support frame inwardly directed for engagement over a jog cart shaft in general alignment over a wheel, locking means on the support frame below the hook means and inwardly directed for releasable engagement with a jog cart to, in conjunction with the hook means, releasably fix the rider support to the jog cart, said rider support including a rider accommodating seat mounted on the upper portion of the support frame and a footrest mounted on the lower portion of the support frame, said footrest projecting outwardly from the support frame.

2. The rider support of claim 1 including a support stabilizing member fixed to the support frame vertically between the hook means and the locking means, said stabilizing member projecting inwardly for engagement with a jog cart.

3. The rider support of claim 2 including means mounting said locking means for adjustable engagement with a jog cart for an inward drawing of the lower portion of the support toward a support received jog cart, the stabilizing member defining a pivot whereby an inward drawing of the lower portion of the support will effect a corresponding outward shifting of the hook means, said hook means including an inner end portion downwardly directed for engagement with the inner sides of said jog cart shafts and a locking of the upper portion of the support to such shafts.

4. The rider support of claim 3 wherein said locking means comprises an internally threaded nut inwardly directed relative to the support frame, said nut being rotatably mounted and restrained against inward movement relative to the support frame, said nut being threadedly lockable to the projecting end of a conventional threaded jog cart wheel axle.

5. The rider support of claim 4 including means mounting said locking means for arcuate adjustment generally parallel to the plane of the support frame.

6. The rider support of claim 5 including means mounting said stabilizing member for selective adjustment inward of the support frame.

7. The rider support of claim 6 including means mounting the stabilizing member for selective adjustment parallel to the plane of the frame.

8. The rider support of claim 7 wherein said stabilizing means includes an inwardly directed saddle-shaped portion adapted to engage about a cart frame member.

9. The rider support of claim 3 wherein said hook means is adjustable inward of the support frame, and means for releasably locking said hook means in any of a plurality of adjusted positions.

10. The rider support of claim 3 including heel guard means on the support frame immediately above the footrest for precluding inward movement of a rider's foot beyond the support frame.

11. The rider support of claim 10 wherein said support frame includes a plurality of laterally spaced upright rods, a frame reinforcing rod on the inner side of each upright rod, each reinforcing rod, at spaced sections along the length thereof, being rigidly fixed to the associated upright rod, each reinforcing rod, between the fixed sections, being inwardly offset relative to the associated upright rod.

12. The rider support of claim 1 wherein said hook means is adjustable inward of the support frame, and means for releasably locking said hook means in any of a plurality of adjusted positions.

13. The rider support of claim 1 wherein said locking means comprises an internally threaded nut inwardly directed relative to the support frame, said nut being rotatably mounted and restrained against inward movement relative to the support frame, said nut being threadedly lockable to the projecting end of a conventional threaded jog cart wheel axle.

14. The rider support of claim 1 including heel guard means on the support frame immediately above the footrest for precluding inward movement of a rider's foot beyond the support frame.

* * * * *